(12) United States Patent
Samad et al.

(10) Patent No.: US 9,404,493 B2
(45) Date of Patent: Aug. 2, 2016

(54) PROGRESSIVE CAVITY PUMP INCLUDING A BEARING BETWEEN THE ROTOR AND STATOR

(71) Applicant: INDIAN INSTITUTE OF TECHNOLOGY MADRAS, Chennai (IN)

(72) Inventors: Abdus Samad, Chennai (IN); Ramasamy Karthikeshwaran, Tanjore (IN)

(73) Assignee: Indian Institute of Technology Madras (IN)

( * ) Notice: Subject to any disclaimer, the term of this patent is extended or adjusted under 35 U.S.C. 154(b) by 274 days.

(21) Appl. No.: 14/124,850

(22) PCT Filed: Apr. 20, 2013

(86) PCT No.: PCT/IB2013/053127
§ 371 (c)(1),
(2) Date: Dec. 9, 2013

(87) PCT Pub. No.: WO2013/182922
PCT Pub. Date: Dec. 12, 2013

(65) Prior Publication Data
US 2014/0369875 A1     Dec. 18, 2014

(30) Foreign Application Priority Data

Jun. 4, 2012 (IN) .......................... 2237/CHE/2012

(51) Int. Cl.
*F04C 2/107* (2006.01)
*F16C 17/18* (2006.01)
*F04C 15/00* (2006.01)

(52) U.S. Cl.
CPC ............... *F04C 2/107* (2013.01); *F04C 2/1073* (2013.01); *F04C 15/0042* (2013.01);
(Continued)

(58) Field of Classification Search
CPC ............................... F04C 2/107; F04C 2/1073
See application file for complete search history.

(56) References Cited

U.S. PATENT DOCUMENTS 3,802,803 A    4/1974   Bogdanov
4,144,001 A *  3/1979   Streicher ............... F04C 2/1075
                                                      418/153
(Continued)

FOREIGN PATENT DOCUMENTS

DE    29805173 U1 *  7/1998  ............ F04C 2/1073
EP     0934464 B1     5/2004
(Continued)

OTHER PUBLICATIONS

International Search Report for application with application No. PCT/IB2013/053127, dated Aug. 30, 2013, 8 pages.

*Primary Examiner* — Mary A Davis
(74) *Attorney, Agent, or Firm* — Moritt Hock & Hamroff LLP; Steven S. Rubin, Esq.

(57) ABSTRACT

Techniques are generally described for a progressive cavity pump and methods for making and using a progressive cavity pump. In an example, a progressive cavity pump may include a stator, a rotor and/or a bearing. The stator may include a helical shaped interior with a first pitch. The rotor may be inside the stator. The rotor may include a helical shaped exterior with a second pitch. The second pitch may be different from the first pitch. The rotor may be effective to rotate with respect to the stator and effective to move eccentrically within the stator to define at least one cavity inside the stator. At least one bearing may be between the rotor and the stator. The bearing may be sized and shaped so that the rotor is effective to rotate inside the bearing and the bearing is effective to move eccentrically along with the rotor.

18 Claims, 2 Drawing Sheets

(52) U.S. Cl.
CPC .......... *F16C 17/18* (2013.01); *F04C 2230/601* (2013.01); *F04C 2230/605* (2013.01); *F04C 2240/52* (2013.01); *F04C 2240/56* (2013.01); *F04C 2270/00* (2013.01); *F16C 2360/42* (2013.01)

(56) References Cited

U.S. PATENT DOCUMENTS

| | | | |
|---|---|---|---|
| 4,482,305 A * | 11/1984 | Natkai | F04C 2/1073 418/150 |
| 4,773,834 A | 9/1988 | Saruwatari | |
| 5,549,160 A | 8/1996 | Bownes | |
| 5,759,019 A | 6/1998 | Wood | |
| 5,807,087 A | 9/1998 | Brandt | |
| 6,220,838 B1 | 4/2001 | Osborne | |
| 6,358,027 B1 | 3/2002 | Lane | |
| 6,457,958 B1 | 10/2002 | Dunn | |
| 6,881,045 B2 | 4/2005 | Zitka | |
| 7,553,139 B2 | 6/2009 | Amburgey et al. | |
| 8,784,085 B2 * | 7/2014 | Hayashimoto | F04C 2/107 418/166 |
| 8,851,204 B2 * | 10/2014 | Knull | E21B 4/003 175/107 |
| 2003/0003000 A1 | 1/2003 | Sheperd | |
| 2005/0169779 A1 | 8/2005 | Bratu | |
| 2006/0278439 A1 | 12/2006 | Ide | |

FOREIGN PATENT DOCUMENTS

| | | |
|---|---|---|
| GB | 2021199 A | 11/1979 |
| GB | 2442564 A | 4/2008 |

* cited by examiner

PROGRESSIVE CAVITY PUMP INCLUDING A BEARING BETWEEN THE ROTOR AND STATOR

CROSS REFERENCE TO RELATED APPLICATIONS

This application is a National Stage filing under 35 U.S.C. §371 of International Application No. PCT/IB2013/053127 filed on Apr. 20, 2013, which in turn claims priority to the Indian Patent Application No.2237/CHE/2012 filed on Jun. 4, 2012, the entirety of which is hereby incorporated by reference.

BACKGROUND

Unless otherwise expressly indicated herein, none of the material presented in this section is prior art to the claims of this application and is not admitted to be prior art by having been included herein.

Progressive cavity pumps may be used to move a fluid from a first location to a second location. The second location may have a higher elevation than the first location. The pump may include a helical rotor effective to rotate inside of a stator. The stator may also have a helical interior cavity with a different pitch than the exterior surface of the rotor. The interior of the stator and the exterior surface of the rotor may define a cavity. As the rotor rotates, the defined cavity may move effectively moving the fluid from the first location to the second location.

SUMMARY

In one example, a progressive cavity pump is generally described. The progressive cavity pump may include a stator, a rotor and/or a bearing. The stator may include a helical shaped interior with a first pitch. The rotor may be inside the stator. The rotor may include a helical shaped exterior with a second pitch. The second pitch may be different from the first pitch. The rotor may be effective to rotate with respect to the stator and effective to move eccentrically within the stator to define at least one cavity inside the stator. At least one bearing may be between the rotor and the stator. The bearing may be sized and shaped so that the rotor is effective to rotate inside the bearing and the bearing is effective to move eccentrically along with the rotor.

In one example, a method of making the progressive cavity pump is generally described. The method may include providing a stator. The stator may include a helical shaped interior with a first pitch. The method may include providing a rotor. The rotor may include a helical shaped exterior with a second pitch. The second pitch may be different from the first pitch. The method may further include placing at least one bearing on the rotor. The method may further include placing the rotor and bearing inside the stator. The rotor may be effective to rotate with respect to the stator and effective to move eccentrically within the stator to define at least one cavity inside the stator. The bearing may be sized and shaped so that the rotor may be effective to rotate inside the bearing and the bearing may be effective to move eccentrically along with the rotor.

In one example, a method of using a progressive cavity pump is generally described. The method may include rotating a rotor inside, and with respect to, a stator to move the rotor eccentrically within the stator and to define at least one cavity inside the stator. The stator may include a helical interior surface with a first pitch. The rotor may include a helical exterior surface with a second pitch. The second pitch may be different from the first pitch. The method may include engaging an exterior surface of a bearing against the helical interior surface of the stator. The method may further include engaging an interior surface of the bearing with the rotor. The method may further include eccentrically moving the bearing along with the rotor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

Figure 1:
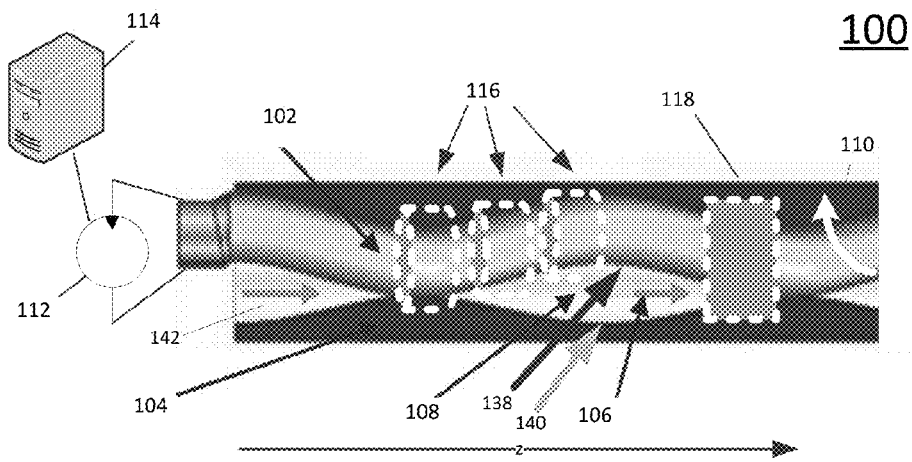
FIG. 1 is a side cut-away view of an example progressive cavity pump.

all arranged according to at least some embodiments described herein.

DETAILED DESCRIPTION

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

This disclosure is generally drawn, inter alia, to devices, apparatus, systems and methods relating to a progressive cavity pump.

Briefly stated, technologies are generally described for a progressive cavity pump and a methods for making and using a progressive cavity pump. In an example, a progressive cavity pump may include a stator, a rotor and/or a bearing. The stator may include a helical shaped interior with a first pitch. The rotor may be inside the stator. The rotor may include a helical shaped exterior with a second pitch. The second pitch may be different from the first pitch. The rotor may be effective to rotate with respect to the stator and effective to move eccentrically within the stator to define at least one cavity inside the stator. At least one bearing may be between the rotor and the stator. The bearing may be sized and shaped so that the rotor may be effective to rotate inside the bearing and the bearing may be effective to move eccentrically along with the rotor.

FIG. 1 is a side cut-away view of an example progressive cavity pump arranged according to at least some embodiments described herein. In some examples, a progressive cavity pump 100 may include a rotor 102, a stator 104 and one or more bearings 116, 118. Rotor 102 may be controlled to rotate in a rotational direction 110 by a driving device 112, such as a motor 112 in communication with rotor 102. Motor 112 may be, in turn, controlled by a processor 114 in communication with motor 112. Driving device 112 may be operated by hand or through other power sources such as by a windmill. A variable frequency drive or a speed reducing gear mechanism may be used to limit a speed of pump 100 to about 300 to about 500 rpm.

Rotor 102 may have an exterior surface 138 with a helical shape and a pitch. Stator 104 may have an interior surface 140 with a helical shape and a pitch different from the pitch of exterior surface 138 of rotor 102. A number of leads or lobes of stator 104 may be equal to the number of lobes in rotor 102 plus 1 (Ns=Nr+1). A pitch may be an axial distance between the start of a particular lobe and an end of the particular lobe—a 360-degree wraparound. A lead may be an axial distance between two adjacent lobes. Looking at the z-axis of stator 104, from left to right in FIG. 1, interior surface 140 of stator 104 includes sections that "turn" circumferentially until a complete 360-degree turnaround is reached at the other end of pump 100. This may correspond to an axial distance equal to a stator pitch. To create an enclosed cavity 108, rotor 102 may include exterior surface 138 with sections that also "twist" around along the z-axis, but, in the example, twice for every one turn of a section of stator 104.

Rotor 102 completes its first 360-degree turnaround at the middle of the stator 104, and the second 360 degree turnaround at the end of the turnaround of stator 104. The rotor pitch may be equal to one-half of the stator pitch in the example of a 1:2 lobe configuration. Exterior surface 138 of rotor 102 and interior surface 140 of stator 104 may define one or more cavities 108. Cavity 108 may be effective to receive a fluid 142. Rotation of rotor 102 within stator 104 in rotational direction 110 may be effective to move fluid 142 in a fluid direction 106 due to, at least in part, the different pitches of exterior surface 138 and interior surface 140. Stator 104 and rotor 102 may be made of, for example, a metal, a metalloid, an alloy, etc.

Bearings 116, 118 may be placed on exterior surface 138 of rotor 102. Bearings 116, 118 may have any desired shape and/or cross-section and may be sized and shaped so as to fit around rotor 102 and allow rotor 102 to rotate within bearings 116, 118. Examples shown in FIG. 1 include bearings 116 with a substantially hollow cylindrical shape and bearing 118 with a substantially hollow rectangular solid shape. A shape of bearings 116, 118 may be selected based on a shape of stator 104. For example, if stator 104 has a rectangular cross-section, bearings 116, 118 may be square or rectangular in cross-section. Similarly, if stator 104 is circular in cross-section, bearings 116, 118 may have a circular or elliptical cross-section.

Figure 2A:
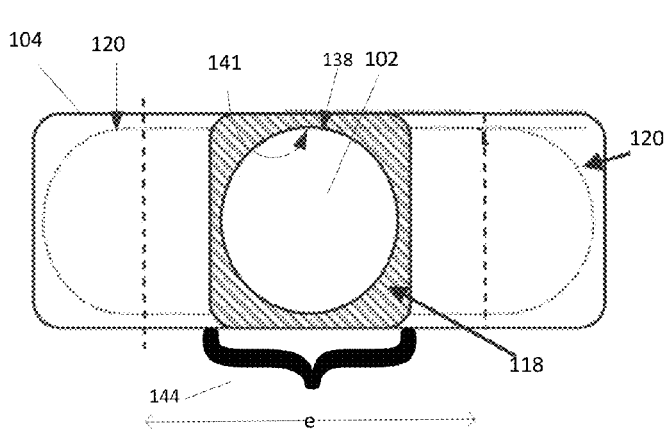
FIG. 2A is a front cut-away view of the progressive cavity pump of FIG. 1.
Figure 2B:
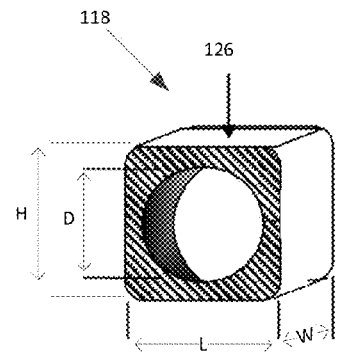
FIG. 2B is a perspective view of a bearing that may be used in the progressive cavity pump shown in FIG. 2A.

FIG. 2A is a front cut-away view of the progressive cavity pump of FIG. 1 arranged according to at least some embodiments described herein. FIG. 2B is a perspective view of a bearing that may be used in the progressive cavity pump shown in FIG. 2A arranged according to at least some embodiments described herein.

Bearing 118 may have interior surface 141 sized and shaped so that rotor 102 can rotate within bearing 118. As mentioned above, in examples when rotor 102 rotates, because, in part, of the helical exterior surface 138 of rotor 102 with a first pitch, and the helical interior surface 140 of stator 104 with a second different pitch, rotor 102 may move eccentrically with respect to stator 104. An eccentricity "e" is shown in FIG. 2A indicating possible extended points of movement of a center of rotor 102 in an example of operation. Also shown is an example path 120 indicating possible eccentric movement of rotor 102 inside stator 104.

In the example shown in FIGS. 2A and 2B, bearing 118 may be a hollow rectangular solid defining a cylindrical interior. In an example, a diameter of the cylindrical interior D may be about 25 mm to about 50 mm. A height H of bearing 118 may be about 30 mm to about 60 mm. A length L of bearing 118 may be about 30 mm to about 60 mm. A width W of bearing 118 may be about 0.5 mm to about 5 mm. A number of bearings 116, 118 that may be used in pump 100 may be based on a size of bearings 116, 118 and a length of rotor 102. For example, if width W is about 1 mm and a length of rotor 102 is about 20 mm then 20 bearings may be used.

Bearings 116, 118 may be made of a metal or metal alloy. Bearings 116, 118 may be made of a high speed steel such as a Fe—C—X multi-component alloy system where X represents chromium, tungsten, molybdenum, vanadium, or cobalt. Surface 126 of bearings 116, 118 may have a relatively low coefficient of friction such as between about 0.05 and about 0.3. Additional lubrication may be provided by fluid pumped through surface 126 allows bearings 116, 118 to engage interior surface of stator 104 with limited frictional losses. Similarly, surface 126 allows bearings 116, 118 to move against other bearings 116, 118 with limited frictional losses.

As rotor 102 rotates and moves eccentrically inside stator 104, bearings 116, 118 may move eccentrically within stator 104 and surface 126 of bearings 118 may engage interior surface 140 of stator 104. Surface 126 may yield more engaged surface area 144 (FIG. 2A), where bearing 118 engages interior surface 140, than if rotor 102 were to engage interior surface 140 without bearings 116, 118. For example, as rotor 102 may have a helical exterior surface 138, without bearings 116, 118, rotor 102 may contact interior surface 140 and form an engaged surface area. The engaged surface area may be illustrated by a point in a two dimensional cross-section, or a line in three dimensions.

In contrast, surface 126 of bearing 118 may contact interior surface 140 which may yield an increased engaged surface area 144 as may be illustrated by a line in a two dimensional cross-section or a rectangle in three dimensions. Increased engaged surface area 144 with interior surface 140 means that less fluid leakage may occur, where fluid 142 on one side of the engaged surface area 144 may leak to an other side of engaged surface area 144. Fluid 142 may act as a lubricant between bearings 116, 118 and stator 104. In examples where bearing 116 has a hollow cylinder shape, bearing 116 may rotate about rotor 102 reducing losses that may otherwise occur due to frictional engagement between rotor 102 and stator 104 if bearing 116 were not used.

Figure 3:
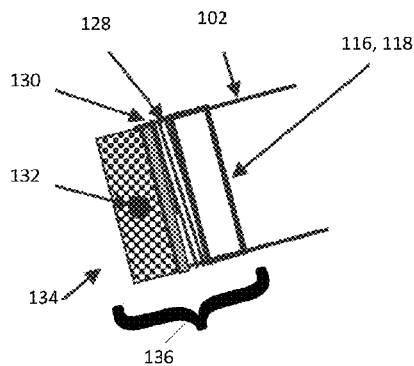
FIG. 3 is a perspective view of a biasing member which may be used in a progressive cavity pump.

FIG. 3 is a perspective view of a biasing member which may be used in a progressive cavity pump arranged according to at least some embodiments described herein. A biasing member 136 may be placed on distal first and second ends of rotor 102. Biasing member 136 may include a thrust bearing 130 and a spring 128. Biasing member 136 may be connected to rotor 102 through a pin 132 in a cap 134. Thrust bearing 130 may be in mechanical communication with spring 128 so that spring 128 applies a force upon bearings 116, 118 toward a center of rotor 102. The forces from springs 128 may be effective to push bearings 116, 118 against one another and thereby inhibit leakage of fluid between bearings 116, 118.

Among other possible benefits, a pump in accordance with the disclosure may yield lower leakage losses in part because elastomeric materials need not be used and metallic materials can be used with less clearance between rotor and stator. As less leakage may be realized, a higher flow rate may be achieved. As the bearings may yield low friction, less power loss may be realized. Fluids may be pumped even at a relatively higher operating temperature because of the reduced frictional loss. A cavity pump in accordance with the disclosure may be used to move fluids such as oil and gas, fluids in the medical or surgical areas, slurries, latex, sewage, resins, varnish, starch, paper pulp, asphalt, paste, paints, mud, cement, sand, grease, clay, abrasive fluids, etc., and may be used with relatively low viscosity fluids. Rotor and stator life may be relatively longer because of clearance between bearings and the stator. Assembly and maintenance may be easier because of the clearance between the bearings and the stator. A bearing may slide on the stator inside surface maintaining a clearance. The clearance may be filled with the liquid which is being pumped. The liquid may act as a lubricant and so a negligible energy loss can be expected.

Figure 4:
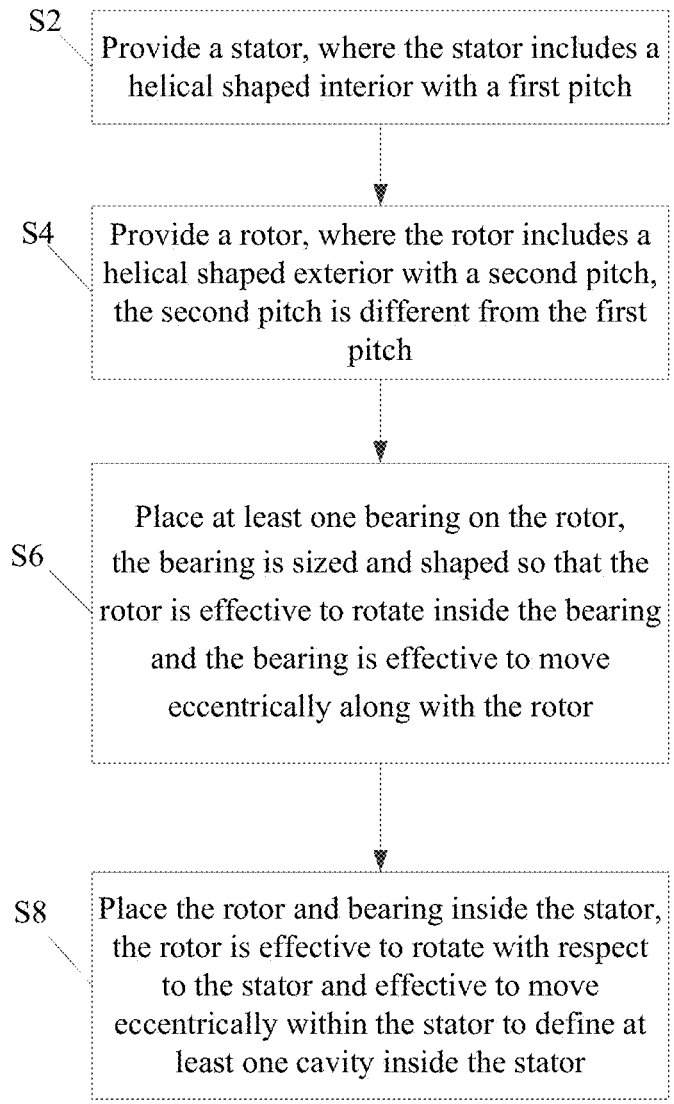
FIG. 4 depicts a flow diagram for example processes for implementing a progressive cavity pump.

FIG. 4 depicts a flow diagram for example processes for making a progressive cavity pump arranged according to at least some embodiments described herein. The process in FIG. 4 could be implemented using, for example, device 100 discussed above. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. Processing may begin at block S2.

At block S2, a stator may be provided. The stator may include a helical shaped interior with a first pitch. The stator may be made of, for example, a metal, metalloid, alloy, etc. Processing may continue from block S2 to block S4.

At block S4, a rotor may be provided. The rotor may include a helical shaped exterior with a second pitch. The second pitch may be different from the first pitch. The rotor may be made of, for example, a metal, metalloid, alloy, etc. Processing may continue from block S4 to block S6.

At block S6, at least one bearing may be placed on the rotor. The bearing may be sized and shaped so that the rotor is effective to rotate inside the bearing and so that the bearing is effective to move eccentrically along with the rotor. The bearing may be made of, for example, a metal or metal alloy and may be a hollow rectangular solid or hollow cylinder. Processing may continue from block S6 to block S8.

At block S8, the rotor and bearing may be placed inside the stator so that the rotor can rotate with respect to the stator and move eccentrically within the stator to define at least one cavity inside the stator.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A progressive cavity pump comprising:
a stator, the stator including a helical shaped interior with a first pitch;
a rotor inside the stator, the rotor including a helical shaped exterior with a second pitch, wherein the second pitch is different from the first pitch, wherein the rotor is effective to rotate with respect to the stator and effective to move eccentrically within the stator to define at least one cavity inside the stator; and
a first bearing and a second bearing between the rotor and the stator, wherein the first and second bearings are sized and shaped so that the rotor is effective to rotate inside the first and second bearings and the first and second bearings are effective to move eccentrically along with the rotor; and
a thrust bearing disposed on the rotor and in mechanical communication with a spring wherein the spring is effective to bias the first bearing toward the second bearing.

2. The progressive cavity pump of claim 1, wherein the thrust bearing is a first thrust bearing and the spring is a first spring, the progressive cavity pump further comprising:
the first thrust bearing disposed at a first end of the rotor; and
a second thrust bearing in mechanical communication with a second spring disposed at a second end of the rotor distal from the first end; wherein
the first and second springs are effective to bias the first bearing toward the second bearing.

3. The progressive cavity pump of claim 1, wherein the thrust bearing is a first thrust bearing and the spring is a first spring, the progressive cavity pump further comprising:
a first pin engaged with a first end of the rotor;
the first thrust bearing in mechanical communication with the first pin;
a second pin engaged with a second end of the rotor distal from the first end;
a second thrust bearing in mechanical communication with the second pin; and
a second spring in mechanical communication with the second thrust bearing and in mechanical communication with the second bearing, wherein the first and second springs are effective to bias the first bearing toward the second bearing.

4. The progressive cavity pump of claim 1, wherein the first and/or second bearing is a hollow cylinder.

5. The progressive cavity pump of claim 1, wherein:
the first and/or second bearing is a hollow cylinder; and
the first and/or second bearing is effective to rotate about the rotor when the respective first and/or second bearing engages the interior of the stator.

6. The progressive cavity pump of claim 1, wherein the first and/or second bearing is a hollow rectangular solid.

7. The progressive cavity pump of claim 1, wherein:
the first and/or second bearing is a hollow rectangular solid; and
a surface of the first and/or second bearing is effective to slide against the interior of the stator upon rotation and eccentric movement of the rotor.

8. The progressive cavity pump of claim 1, wherein the first and/or second bearing is made of a metal or metal alloy.

9. The progressive cavity pump of claim 1, wherein the first and/or second bearing is made of a Fe—C—X multi-component alloy system where X represents chromium, tungsten, molybdenum, vanadium, or cobalt.

10. The progressive cavity pump of claim 1, wherein the thrust bearing is a first thrust bearing and the spring is a first spring, the progressive cavity pump further comprising:
a first pin engaged with a first end of the rotor;
the first thrust bearing in mechanical communication with the first pin;
a second pin engaged with a second end of the rotor distal from the first end;
a second thrust bearing in mechanical communication with the second pin; and
a second spring in mechanical communication with the second thrust bearing and in mechanical communication with the second bearing, wherein the first and second springs are effective to bias the first bearing toward the second bearing;
the first and second bearings are a hollow rectangular solids; and
a surface of the first and second bearings is effective to slide against the interior of the stator upon rotation and eccentric movement of the rotor.

11. A method of making a progressive cavity pump, the method comprising:
providing a stator, wherein the stator includes a helical shaped interior with a first pitch;
providing a rotor, wherein the rotor includes a helical shaped exterior with a second pitch, wherein the second pitch is different from the first pitch;
placing a first bearing on the rotor;
placing a second bearing on the rotor;
placing a thrust bearing on the rotor, the thrust bearing in mechanical communication with a spring wherein the spring is effective to bias the first bearing toward the second bearing;
placing the rotor, the first and second bearings, the thrust bearing and the spring inside the stator;
wherein
the rotor is effective to rotate with respect to the stator and effective to move eccentrically within the stator to define at least one cavity inside the stator; and
the first and second bearings are sized and shaped so that the rotor is effective to rotate inside the first and second bearings and the first and second bearings are effective to move eccentrically along with the rotor.

12. The method of claim 11, wherein the thrust bearing is a first thrust bearing and the spring is a first spring, the method further comprising:

placing the first thrust bearing on a first end of the rotor; and placing a second thrust bearing in mechanical communication with a second spring at a second end of the rotor distal from the first end; wherein the first and second springs are effective to bias the first bearing toward the second bearing.

13. The method of claim 11, wherein:

the first and/or second bearing is a hollow cylinder; and the first and/or second bearing is effective to rotate about the rotor when the respective first and/or second bearing engages the interior of the stator.

14. The method of claim 11, wherein:

the first and/or second bearing is a hollow rectangular solid; and a surface of the first and/or second bearing is effective to slide against the interior of the stator upon rotation of the rotor.

15. A method of using a progressive cavity pump, the method comprising:

rotating a rotor inside, and with respect to, a stator to move the rotor eccentrically within the stator and to define at least one cavity inside the stator, wherein the stator includes a helical interior surface with a first pitch, and the rotor includes a helical exterior surface with a second pitch, wherein the second pitch is different from the first pitch, engaging an exterior surface of a first bearing against the helical interior surface of the stator;

engaging an exterior surface of a second bearing against the helical interior surface of the stator;

engaging an interior surface of the first bearing with the rotor;

engaging an interior surface of the second bearing with the rotor;

wherein a spring in mechanical communication with a thrust bearing on the rotor is effective to bias the first bearing toward the second bearing; and eccentrically moving the first and second bearings along with the rotor.

16. The method of claim 15, further comprising:

applying a fluid to the cavity; and moving the fluid from a first end of the pump to a second end of the pump.

17. The method of claim 15, wherein:

the first and/or second bearing is a hollow cylinder; and the first and/or second bearing is effective to rotate about the rotor when the respective first and/or second bearing engages the interior of the stator.

18. The method of claim 15, wherein:

the first and/or second bearing is a hollow rectangular solid; and a surface of the first and/or second bearing is effective to slide against the interior of the stator upon rotation of the rotor.

* * * * *